(12) United States Patent
Kimura

(10) Patent No.: US 11,336,210 B2
(45) Date of Patent: May 17, 2022

(54) VIBRATION TYPE ACTUATOR AND MANUFACTURING METHOD OF VIBRATION TYPE ACTUATOR

(71) Applicant: CANON KABUSHIKI KAISHA, Tokyo (JP)

(72) Inventor: Atsushi Kimura, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 171 days.

(21) Appl. No.: 16/738,902

(22) Filed: Jan. 9, 2020

(65) Prior Publication Data

US 2020/0235678 A1 Jul. 23, 2020

(30) Foreign Application Priority Data

Jan. 17, 2019 (JP) .............................. JP2019-006395

(51) Int. Cl.
*H02N 2/00* (2006.01)
*H02N 2/02* (2006.01)

(52) U.S. Cl.
CPC ............. *H02N 2/008* (2013.01); *H02N 2/001* (2013.01); *H02N 2/026* (2013.01); *H02N 2/028* (2013.01)

(58) Field of Classification Search
CPC ........ H02N 2/008; H02N 2/026; H02N 2/001; H02N 2/028; H02N 2/22; H02N 2/103; H02N 2/0015; H02N 2/02; H02N 2/06; G02B 7/09; G03B 13/36
See application file for complete search history.

(56) References Cited

U.S. PATENT DOCUMENTS

| 5,870,634 A * | 2/1999 | Sugaya ..................... G03B 5/00 396/52 |
| 2014/0071545 A1* | 3/2014 | Sumioka .................. G03B 5/00 359/813 |

FOREIGN PATENT DOCUMENTS

| JP | 2011-234608 A | 11/2011 |
| JP | 2011-259559 A | 12/2011 |

\* cited by examiner

*Primary Examiner* — Emily P Pham
(74) *Attorney, Agent, or Firm* — Canon U.S.A., Inc. I.P. Division

(57) ABSTRACT

A vibration type actuator including vibrating elements and a contact element that is brought into contact with each other in a first direction. The vibration of the vibrating elements includes vibration in a first vibration mode in the first direction and vibration in a second vibration mode in a second direction intersecting the first direction. In the vibrating elements, a minimum value of a resonance frequency in the second vibration mode is greater than or equal to a maximum value of a resonance frequency in the first vibration mode, and a ratio of a difference between the maximum value and the minimum value of the resonance frequency in the second vibration mode to the minimum value of the resonance frequency in the second mode is less than or equal to a predetermined value.

6 Claims, 11 Drawing Sheets

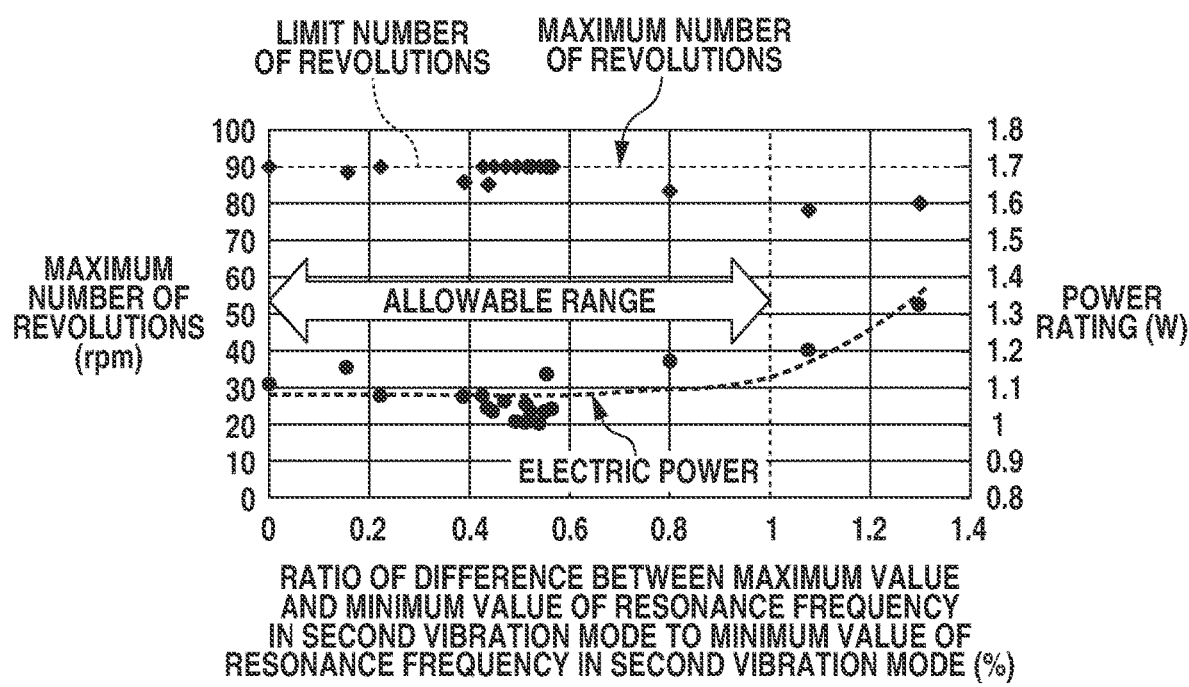

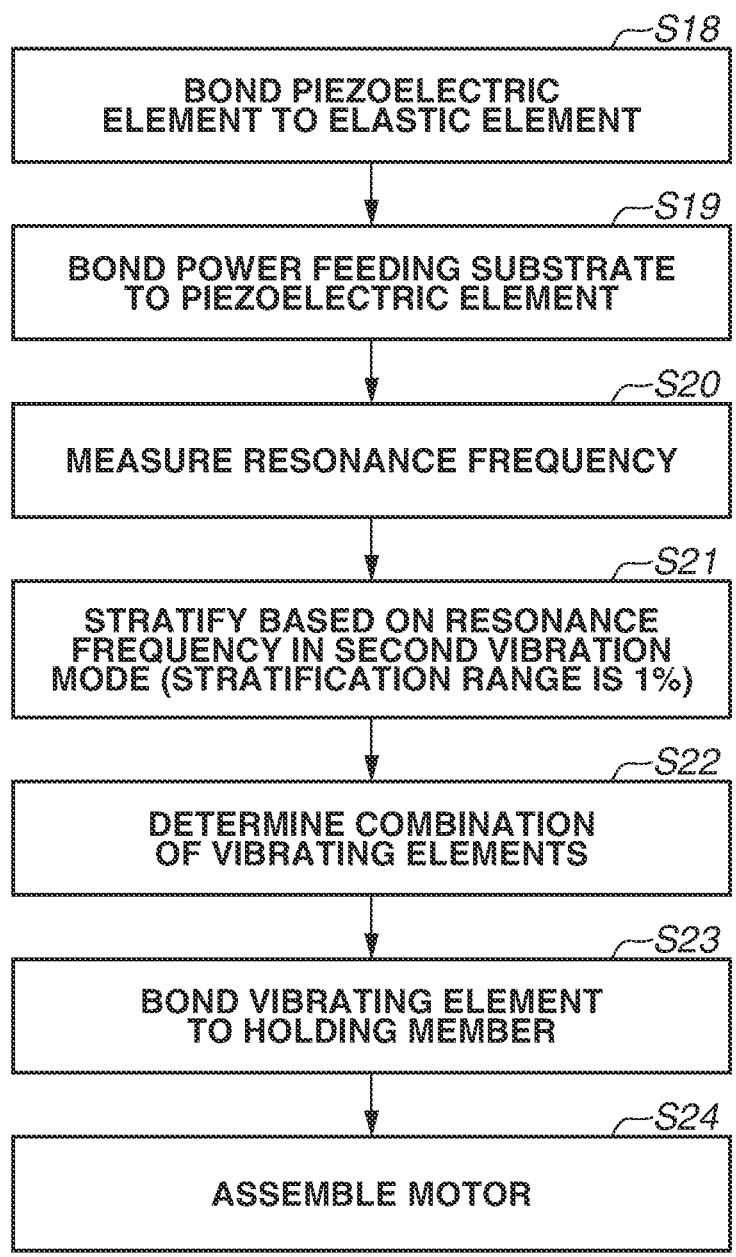

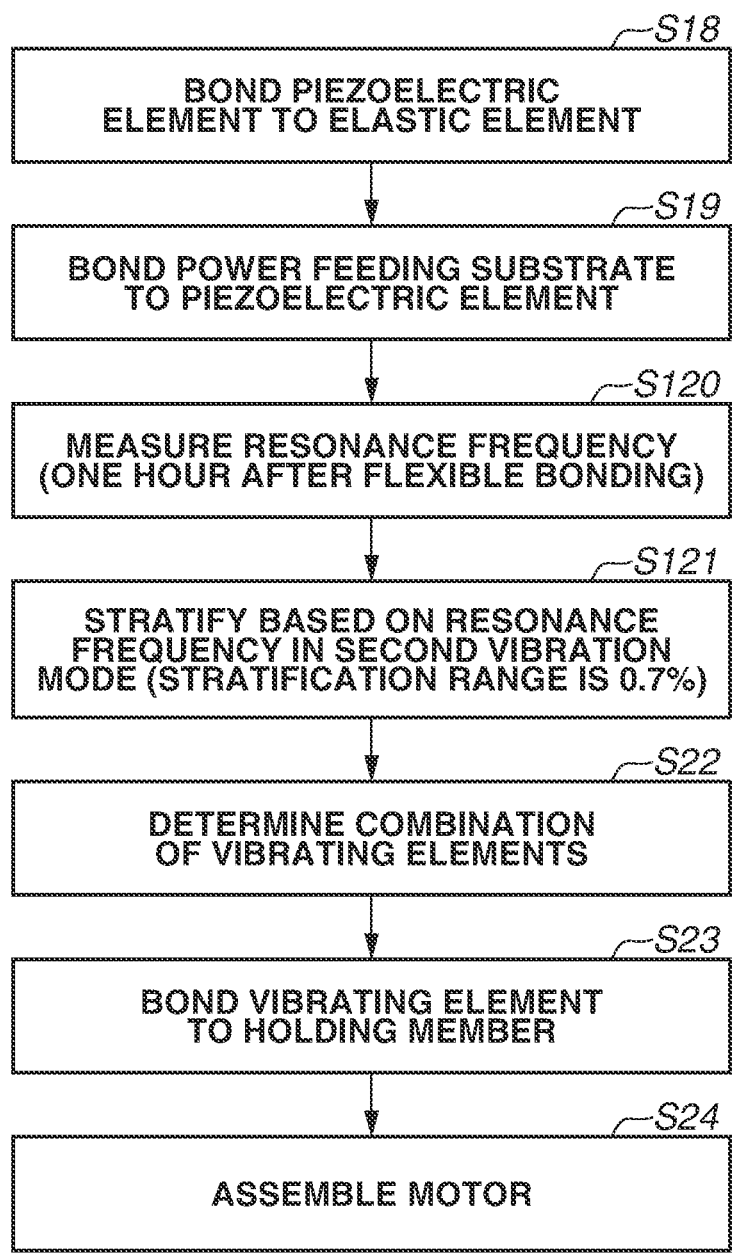

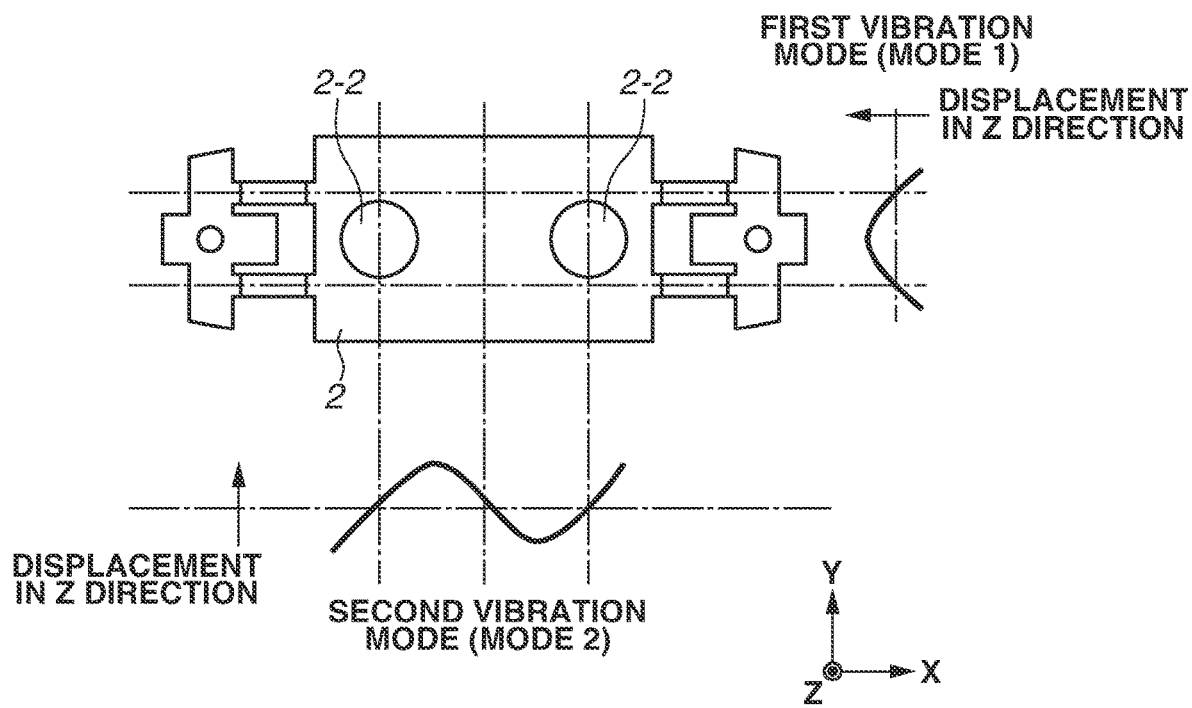

FIRST VIBRATION
MODE (MODE 1)

SECOND VIBRATION
MODE (MODE 2)

VIBRATION TYPE ACTUATOR AND MANUFACTURING METHOD OF VIBRATION TYPE ACTUATOR

BACKGROUND

Field of the Disclosure

The present disclosure relates to a vibration type actuator.

Description of the Related Art

Conventionally, a vibration type actuator has been proposed. The vibration type actuator is configured so that a contact element that is brought into contact with a vibrating element (elastic element, piezoelectric element) is driven by vibration excited by the vibrating element (the vibrating element and the contact element are relatively moved).

For example, Japanese Patent Application Laid-Open No. 2011-259559 discusses an actuator includes two vibrating elements or a plurality of vibrating elements. The two vibrating elements are linearly driven or the plurality of vibrating elements is rotationally driven.

However, in a vibrating element, a resonance frequency varies due to variations in dimensions of an elastic element and a piezoelectric element. Thus, in a case where one contact element is driven by a plurality of vibrating elements using one booster circuit, namely, a common alternating signal, a performance of an actuator might be degraded in some cases depending on a combination of vibrating elements.

SUMMARY

The present disclosure is directed to a technique that reduces a deterioration of a performance caused by variations of a resonance frequency of a plurality of vibrating elements disposed in a vibration type actuator.

According to an aspect of the present disclosure, a vibration type actuator includes a plurality of vibrating elements, and a contact element that is brought into contact with contact sections of the plurality of vibrating elements and vibration excited in each of the plurality of vibrating elements causes relative movement of the plurality of vibrating elements and the contact element. The vibration includes vibration in a first vibration mode where the contact sections are displaced in a first direction in which one of the plurality of vibrating elements and the contact element are made to pressure contact with each other and vibration in a second vibration mode where the contact sections are displaced in a second direction intersecting the first direction. In the plurality of vibrating elements, a minimum value of a resonance frequency in the second vibration mode is greater than or equal to a maximum value of a resonance frequency in the first vibration mode, and a ratio of a difference between the maximum value and the minimum value of the resonance frequency in the second vibration mode to the minimum value of the resonance frequency in the second mode is less than or equal to a predetermined value.

Further features of the present disclosure will become apparent from the following description of exemplary embodiments with reference to the attached drawings.

BRIEF DESCRIPTION OF THE DRAWINGS

FIG. 3C is a diagram illustrating a relationship between variations in the second resonance frequency of the three vibrating elements and a motor performance (horizontal axis; a ratio of a difference between a maximum value and a minimum value of a resonance frequency in the second vibration mode to the minimum value of the resonance frequency in the second vibration mode) according to the exemplary embodiment.

FIG. 4 is a flowchart relating to steps of manufacturing a vibration type actuator according to the exemplary embodiment.

FIG. 5 is a flowchart relating to a variation example of steps of manufacturing the vibration type actuator according to the exemplary embodiment.

FIG. 9A is an explanatory diagram illustrating vibration modes of the vibrating element.

DESCRIPTION OF THE EMBODIMENTS

First, a conventional technique is described with reference to FIGS. 8A to 9C.

Figure 8A:
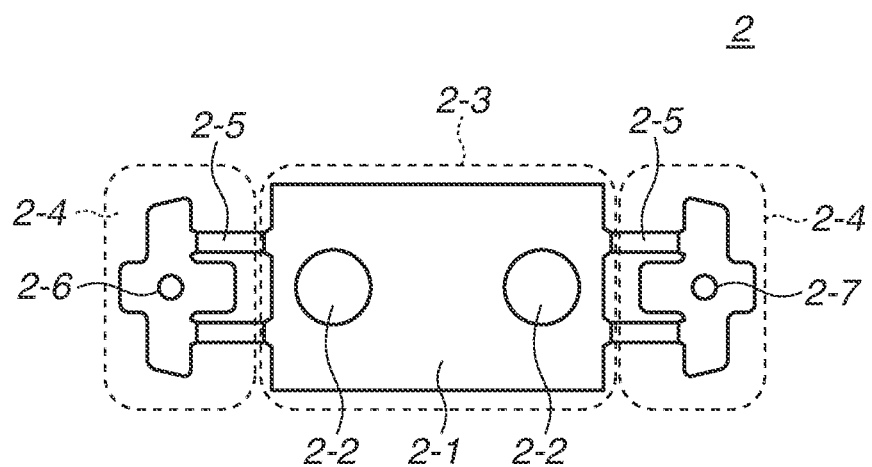
FIGS. 8A and 8B are a plan view and a side view respectively illustrating a configuration of a vibrating element.
Figure 8B:
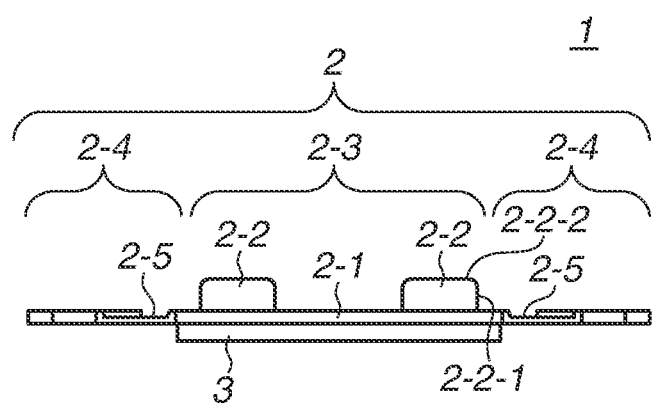

FIG. 8A is a plan view of the vibrating element, and FIG. 8B is a side view of the vibrating element. In FIGS. 8A and 8B, a vibrating element 1 includes an electrical energy-to-mechanical energy conversion element (piezoelectric element) 3 having a shape of a rectangular (quadrangular) thin plate, and an elastic element 2 that is integrally bonded to (one plane of) the piezoelectric element 3.

The elastic element 2 includes a main section 2-3 and support sections 2-4.

The main section 2-3 includes a base section 2-1 and two protrusions 2-2. The base section 2-1, which has a shape of a rectangular thin plate, vibrates together with the piezoelectric element 3. The protrusions 2-2 protrude from one plane of the base section 2-1 (the plane of the elastic element 2 opposite to the plane to which the piezoelectric element 3 is bonded). The protrusions 2-2 each include a side wall section 2-2-1 and a contact section 2-2-2, for example, as discussed in Japanese Patent Application Laid-Open No. 2011-234608. The side wall section 2-2-1 protrudes from the one plane of the base section 2-1 to a direction of making pressure contact with the contact element (first direction)

and has a hollow (continuous) structure. The contact section 2-2-2 is at a leading edge of each of the protrusions 2-2 and is brought into contact with the contact element.

The support sections 2-4 each have flexibility and are structurally integral with the main section 2-3. The support sections 2-4 each have a thin section 2-5, which is configured by partially thinning each support section 2-4 so that vibration of the main section 2-3 is not transmitted outside as much as possible. Further, the support sections 2-4 have a circular hole 2-6 and a slotted hole 207, respectively, to be used for positioning when the piezoelectric element 3 is bonded and the vibrating element is assembled. Hereinafter, a Z direction is defined as a direction of making pressure contact with the vibrating element and the contact element, an X direction is defined as a direction of relative movement of the vibrating element and the contact element, and a Y direction is defined as a direction perpendicular to the X direction and the Z direction, respectively.

Figure 9B:
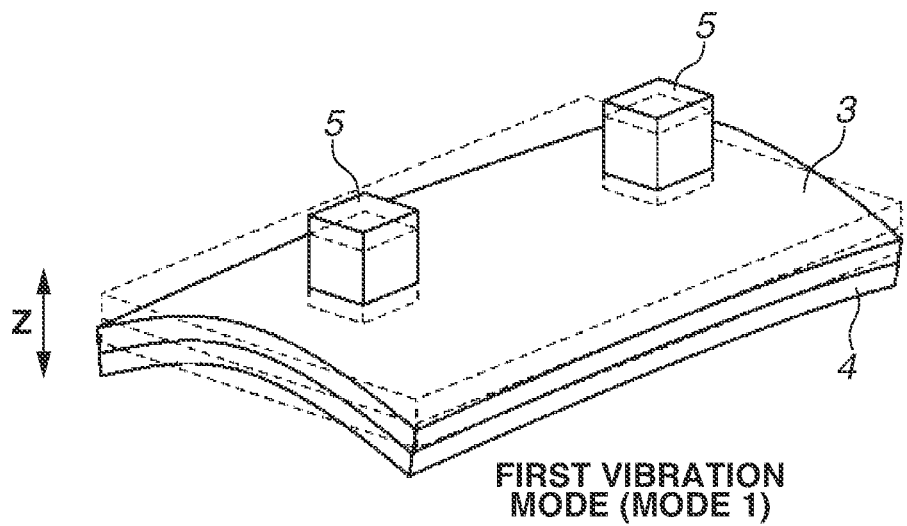
FIG. 9B and FIG. 9C are explanatory diagrams each illustrating a first vibration mode and a second vibration mode of the vibrating element.
Figure 9C:
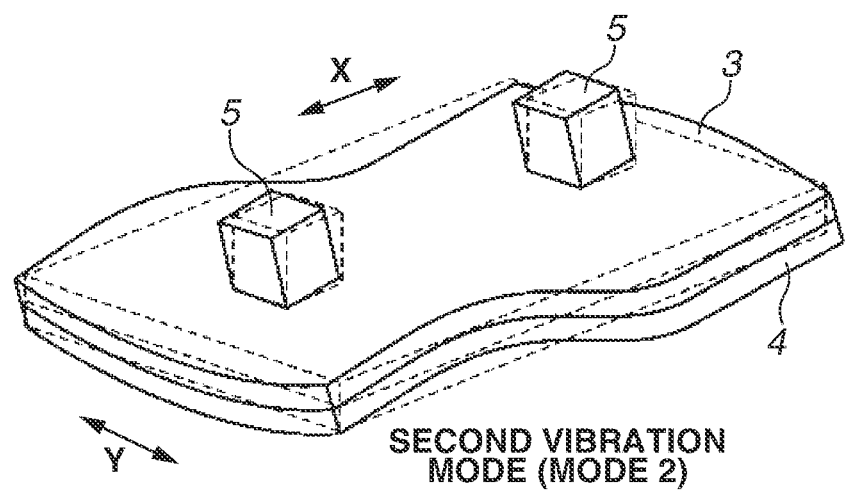

The vibrating element 1 causes a first bending motion in a short direction (Y) as illustrated in FIG. 9A. The first bending motion mainly causes leading edges of the protrusions 2-2 to be displaced in a Z direction (first direction). Further, the vibrating element 1 causes a second bending motion in a longitudinal direction (X). The second bending motion mainly causes the leading edges of the protrusions 2-2 to be displaced in a direction including an X direction component (direction which intersects the first direction: hereinafter, "second direction"). At this time, the first bending motion and the second bending motion are generated to have a temporal phase difference. Thus, the leading edges of the protrusions 2-2 each make an ellipsoidal motion, and a contact element, not illustrated, is driven in the X direction as illustrated in FIG. 9A. Herein, "the direction which intersects the first direction" (second direction) includes also "a direction orthogonal to the first direction". FIG. 9B also illustrates the first bending motion (first vibration mode or mode 1). Further, FIG. 9C also illustrates the second bending motion (second vibration mode or mode 2). Herein, an order of the first vibration mode (first order) illustrated in FIGS. 9A and 9B is 1, and an order of the second vibration mode (second order) illustrated in FIGS. 9A and 9C is 2. The order means a number of antinodes of vibration.

An exemplary embodiment of the present disclosure will be described in detail below with reference to the accompanying drawings. In the present exemplary embodiment, a vibration type actuator includes a vibrating element where vibration is excited and a contact element that is brought into pressure contact with the vibrating element. The vibrating element and the contact element perform relative movement by the vibration. That is, the vibration type actuator is configured so that a drive output from the vibrating element can be taken out by the relative movement of the vibrating element and the contact element.

Figure 1A:
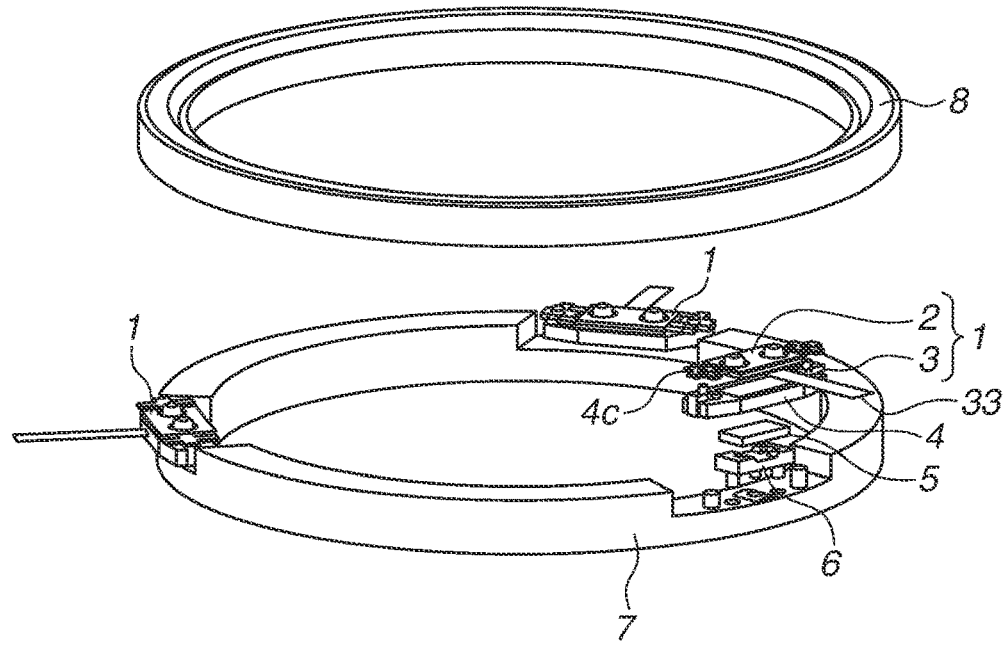
FIG. 1A is an overall perspective view illustrating disassembled parts of a rotary actuator according to an exemplary embodiment.
Figure 1B:
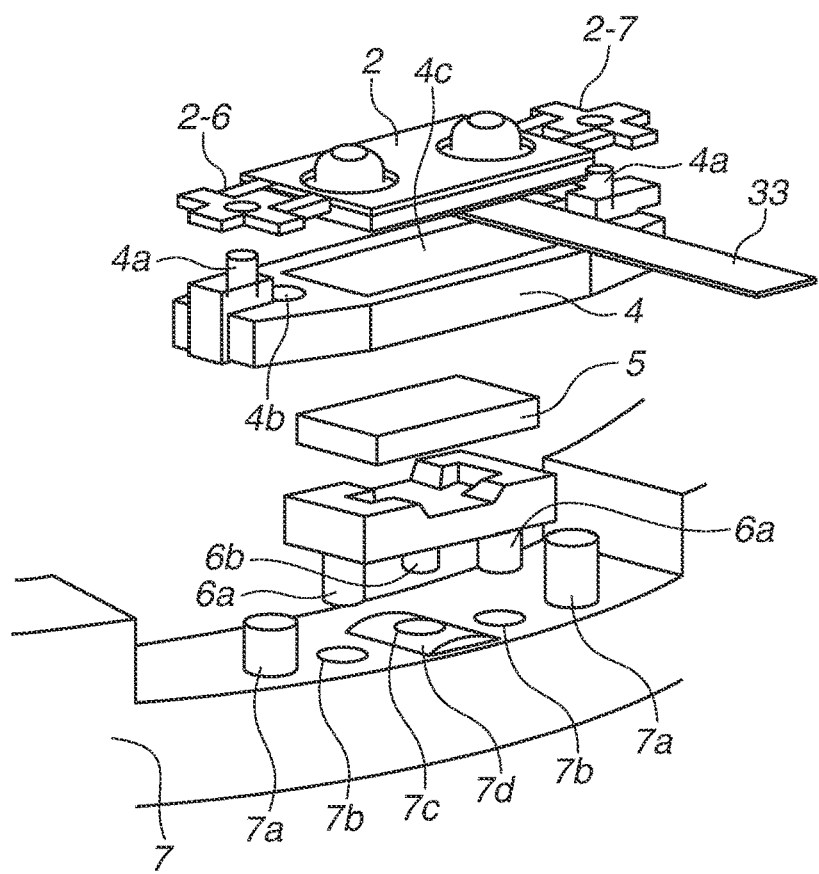
FIG. 1B is an enlarged and developed perspective view illustrating a periphery of a vibrating element according to the exemplary embodiment.

FIGS. 1A and 1B illustrate a first exemplary embodiment of the present disclosure.

FIG. 1A is a perspective view illustrating disassembled parts of a rotary actuator having three (a plurality of) vibrating elements (of vibration type actuator), illustrated in FIGS. 8A and 8B, disposed on a circumference. FIG. 1B is an enlarged and developed perspective view illustrating a periphery of a vibrating element 1.

As illustrated in FIG. 1A, the three (plurality of) vibrating elements 1 are disposed on a circular base (support member) 7 to rotationally drive a rotor (contact element) 8 that is brought into contact with the vibrating elements 1.

Each of the vibrating elements 1 is held onto a small base (holding member 4) by fitting pins 4a of a holding member 4 into a circular hole 2-6 and a slotted hole 2-7 of a support section, respectively, and bonding them. Further, the holding member 4 is positioned to be freely moved in a pressurizing direction by fitting pins 7a of a support member 7 into holes 4b, respectively.

A rectangular through hole 4c is provided to the holding member 4, and a pressing member 6 that presses each of the vibrating elements 1 fits into the through hole 4c. When the pressing member 6 touches the support member 7, a pressurizing member (such as a spring), not illustrated, causes the pressing member 6 to press the vibrating element 1 via a vibration isolating member 5 (such as felt). Further, the pressing member 6 is relatively movable in the pressurizing direction with respect to the holding member 4.

Such a configuration makes it difficult for the support sections 2 to 4 to receive a reaction force generated upon pressurizing, and thus prevents the bonding of a piezoelectric element from being peeled. A flexible printed board (power feeding substrate) 33 that feeds power is bonded to an electric energy-to-mechanical energy conversion element (piezoelectric element) 3. An alternating-current signal is applied to the piezoelectric element 3 via the power feeding substrate 33 to drive the vibrating element 1.

Positioning pins 6a and 6b are disposed on the pressing member 6. The pressing member 6 is positioned by fitting the positioning pins 6a and 6b into holes 7b and 7c, respectively, disposed on the support member 7. Further, the pressing member 6 is brought into contact with a semicircular column-shaped surface (protruded section) 7d of the support member 7 to be rotatable in a pitching direction (direction of a relative motion with respect to the contact element 8).

Figure 2:
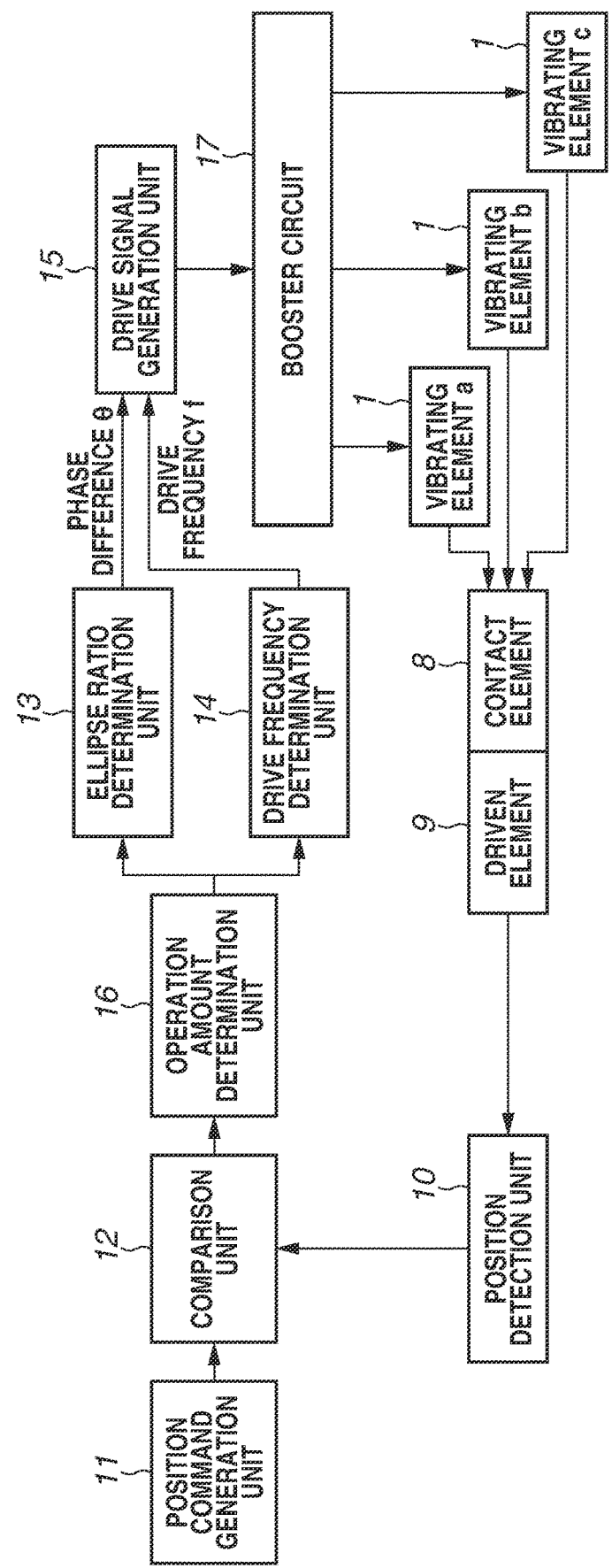
FIG. 2 is a block diagram illustrating a configuration of a drive control apparatus of the rotary actuator according to the exemplary embodiment.

FIG. 2 is a block diagram illustrating a configuration of a drive control apparatus of a rotary actuator illustrated in FIGS. 1A and 1B. The drive control apparatus includes a position command generation unit 11 that generates a target value of a driven element 9 that is driven integrally with the contact element 8. An output side of the position command generation unit 11 is connected to an operation amount determination unit 16 via a comparison unit 12. The comparison unit 12 compares the target value output from the position command generation unit 11 with a current position of the driven element 9 output from a position detection unit 10. The operation amount determination unit 16 calculates an operation amount of the vibration type actuator based on the comparison result of the comparison unit 12. The operation amount determination unit 16 is a proportional-integral (PI) controller or a proportional-integral-derivative (PID) controller.

The position detection unit 10, which is, for example, an encoder, detects a position of the driven element 9. Vibrating elements a, b, and c, which are the above-described three vibrating elements 1 illustrated in FIG. 1A, integrally drive the contact element 8 and the driven element 9. An output side of the operation amount determination unit 16 is connected to an ellipse ratio determination unit 13 and a drive frequency determination unit 14. The ellipse ratio determination unit 13 sets an ellipse ratio of an ellipsoidal motion. The drive frequency determination unit 14 sets a frequency of an alternating-current signal.

The ellipse ratio determination unit 13 sets a ratio between an X-axis amplitude and a Z-axis amplitude of the ellipsoidal motion generated on the protrusion (contact section) of each of the vibrating elements 1 based on an output from the operation amount determination unit 16. As a result, the ellipse ratio determination unit 13 can set a temporal phase difference of two amplitude modes that achieve this ratio. The drive frequency determination unit 14 can set a drive frequency of an alternating-current voltage to be applied to each of the vibrating elements 1 based on the output from the operation amount determination unit 16. Further, output sides of the ellipse ratio determination unit 13 and the drive frequency determination unit 14 are connected to a drive signal generation unit 15.

The drive signal generation unit 15 generates a two-phase alternating-current signal having a frequency determined by the drive frequency determination unit 14 and a phase difference determined by the ellipse ratio determination unit 13. An output side of the drive signal generation unit 15 is connected to a booster circuit 17. The booster circuit 17 boosts the two-phase alternating-current signal generated by the drive signal generation unit 15. The boosted two-phase alternating-current signal is applied to the three vibrating elements 1 (vibrating elements a, b, and c) in parallel. The booster circuit 17 can be a power amplifier, a switching element, a direct current (DC)-direct current (DC) circuit, or a transform circuit.

Figure 3A:
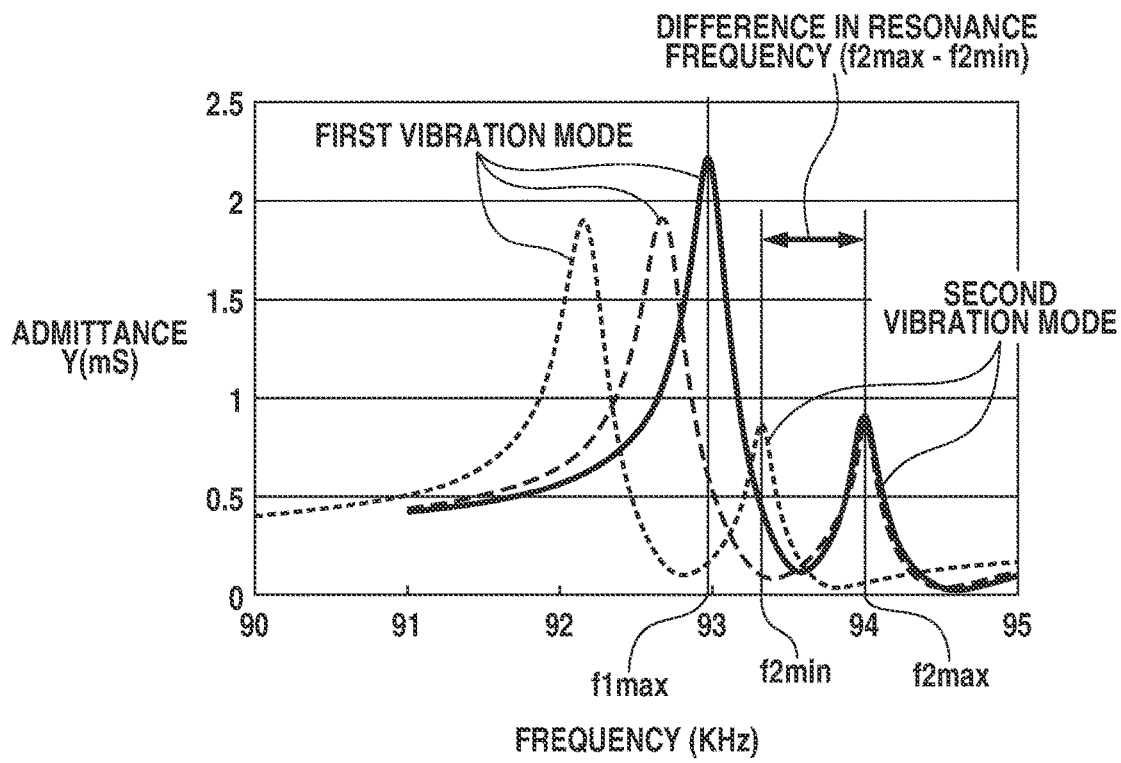
FIG. 3A is a diagram illustrating impedance characteristics of respective vibrating elements according to the exemplary embodiment.

FIG. 3A illustrates an example of impedance characteristics of the respective three vibrating elements 1 (three kinds of lines indicate impedance characteristics of different vibrating elements, respectively). An axis of abscissa represents the drive frequency, and an axis of ordinate represents admittance (reciprocal of the impedance). A peak frequency of the admittance is a resonance frequency. One vibrating element 1 has two peaks that are the resonance frequency of the first bending motion (first vibration mode) and the resonance frequency of the second bending motion (second vibration mode) described above. In the first bending motion, displacement is caused based on a first order. In the second bending motion, displacement is caused based on a second order. In a pressurized motor state, the two peaks tend to be close to each other. Note that the first order "1" and the second order "2" are desirable orders in (vibration type actuator having) the vibrating element 1 illustrated in FIGS. 8A and 8B. Accordingly, the first order and the second order are variable depending on the types of (the vibration type actuator having) the vibrating element 1, and thus orders for carrying out the present disclosure are not limited to the orders described here.

In this example, in the plurality (three) of the vibrating elements 1, a difference between a maximum value $f_2$max (94.0 kHz) and a minimum value $f_2$min (93.3 kHz) of the resonance frequency in the second vibration mode where displacement is caused based on the second order is 0.7 kHz. That is, in the three vibrating elements 1, a ratio (0.7/93.3) of the difference (0.7 kHz) between the maximum value $f_2$max and the minimum value $f_2$min of the resonance frequency in the second vibration mode, where displacement is caused based on the second order to the minimum value $f_2$min (93.3 kHz), is 0.0075 (0.75%).

Figure 3B:
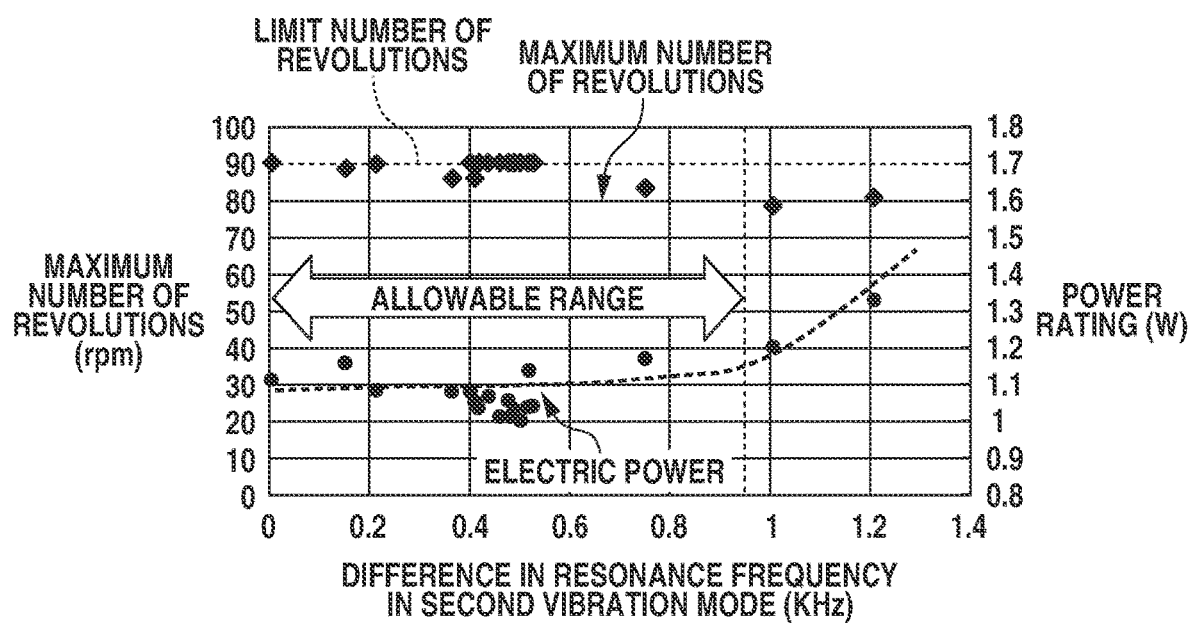
FIG. 3B is a diagram illustrating a relationship between variations in a second resonance frequency of three vibrating elements and a motor performance (horizontal axis; a difference in a resonance frequency in a second vibration mode) according to the exemplary embodiment.

FIG. 3B illustrates an example of a measured result representing a relationship between the difference in the resonance frequency in the second vibration mode obtained in FIG. 3A ($f_2$max−$f_2$min) and a motor performance. A horizontal axis represents a difference between a maximum value and a minimum value in a resonance frequency in the second vibration mode. An axis of ordinate represents power consumption at a maximum number of revolutions and a predetermined number of revolutions. FIG. 3C is a diagram where representation of a horizontal axis of FIG. 3B is replaced by a ratio of the difference between the maximum value and the minimum value of the resonance frequency in the second vibration mode to the minimum value of the resonance frequency in the second vibration mode.

The maximum number of revolutions is 90 rpm in order to prevent breakage of the vibrating elements 1. As illustrated in FIG. 3B, in the plurality of vibrating elements 1 where the minimum value $f_2$min of the resonance frequency in the second vibration mode is 90 kHz, in a case where the difference between the maximum value $f_2$max and the minimum value $f_2$min of the resonance frequency in the second vibration mode exceeds 0.9 kHz, the power consumption tends to increase and thus a motor efficiency decreases. That is, in the plurality of vibrating elements 1, in a case where the ratio of the difference between the maximum value $f_2$max and the minimum value $f_2$min of the resonance frequency in the second vibration mode to the minimum value $f_2$min exceeds 0.01 (1%), the power consumption tends to increase and thus the motor efficiency (performance) decreases. (See FIG. 3C)

Therefore, the plurality of vibrating elements 1 is selected from the plurality of stratified (classified) vibrating elements 1 to be combined so that the ratio of the difference between the maximum value $f_2$max and the minimum value $f_2$min of the resonance frequency in the second vibration mode to the minimum value $f_2$min is less than or equal to 0.01 (1%). As a result, performance degradation due to variations in the resonance frequency can be reduced, and thus an actuator having satisfactory performance can be provided. Details of stratification will be described below.

The performance of the actuator mostly depends on an amount of displacement in the X direction in the second vibration mode. The displacement in the Z direction in the first vibration mode can be achieved with a certain amount, and thus the amount of the displacement needs not to exceed that certain amount. Therefore, attention is paid only to the resonance frequency in the second vibration mode in a case of a drive using the plurality of vibrating elements 1.

The actuator is driven with a high frequency, and the frequency is lowered to be close to the resonance frequency in the second vibration mode. Thus, the speed of the actuator is increased. For this reason, if the resonance frequency in the second vibration mode is not higher than the resonance frequency in the first vibration mode, vibration amplitude in the first vibration mode abruptly decreases beyond the resonance frequency before vibration amplitude in the second vibration mode becomes large. Thus, satisfactory performance cannot be obtained.

Therefore, in the case of the drive using the plurality of vibrating elements 1, as illustrated in FIG. 3A, the minimum value $f_2$min of the resonance frequency in the second vibration mode is set to be more than or equal to a maximum value f1max of the resonance frequency in the first vibration mode.

As to Δf regarding a single vibrating element 1, which is a difference (f2−f1) between the value f2 of the resonance frequency in the second vibration mode and the value f1 of the resonance frequency in the first vibration mode, Δf is desired to be more than or equal to 0.5 kHz and less than or equal to 5 kHz. If Δf is less than 0.5 kHz, when the vibrating element 1 is driven with around the resonance frequency in the second vibration mode, the possibility that the drive frequency is beyond the resonance frequency in the first vibration mode and the vibration amplitude abruptly decreases might increase. On the other hand, if Δf is more than 5 kHz, when the vibrating element 1 is driven with around the resonance frequency in the second vibration mode, the drive frequency is far from the resonance frequency in the first vibration mode and the vibration amplitude in the first vibration mode is hard to become large.

FIG. 4 is a flowchart illustrating steps of manufacturing the vibration type actuator according to the exemplary embodiment of the present disclosure.

As illustrated in FIG. 4, in step S18, the piezoelectric element 3 is bonded to an elastic element, and in step S19, the flexible printed board (power feeding substrate) 33 is bonded to the piezoelectric element 3. After steps S18 and S19, the resonance frequencies in the two vibration modes are measured by impedance measurement using a single vibrating element 1 in step S20. Stratification is performed within a stratification range of 1% based on the measured resonance frequency in the second vibration mode.

The stratification is to classify the plurality of vibrating elements 1 into groups. For example, in the plurality of vibrating elements 1, in a case where the minimum value $f_2$min of the resonance frequency in the second vibration mode is 100 kHz, the ratio 0.01 (1%) is 1 kHz. Therefore, for example, the vibrating elements 1 in a range from 100 kHz or more to less than 101 kHz are classified into a first group, and the vibrating elements 1 in a range from 101 kHz or more to less than 102 kHz are classified into a second group. Further, the vibrating elements in a range from 102 kHz or more to less than 103 kHz are classified into a third group.

In this stratification in step S21, in the vibrating elements 1 within the group, the ratio of the difference between the maximum value $f_2$max and the minimum value $f_2$min of the resonance frequency in the second vibration mode to the minimum value $f_2$min can be set to a value less than or equal to 0.01 (1%). Therefore, in step S22, the vibrating elements 1 are selected at random within a group. In step S23, bonding of the vibrating element holding member is performed. In step S24, motor assembly is performed. In such a manner, a motor having satisfactory performance can be obtained.

FIG. 5 is a flowchart illustrating a variation example of the steps of manufacturing the vibration type actuator according to the exemplary embodiment of the present disclosure. This variation example can be used in a certain situation of a production site. That is, when the time from bonding of the power feeding substrate 33 in step S19 to measurement of the resonance frequency in step S120 is desired to be shortened, the measurement of the resonance frequency in step S120 is performed one hour after the bonding of the power feeding substrate 33 in step S19 (temperatures of the vibrating elements 1 are securely room temperature).

Figure 6:
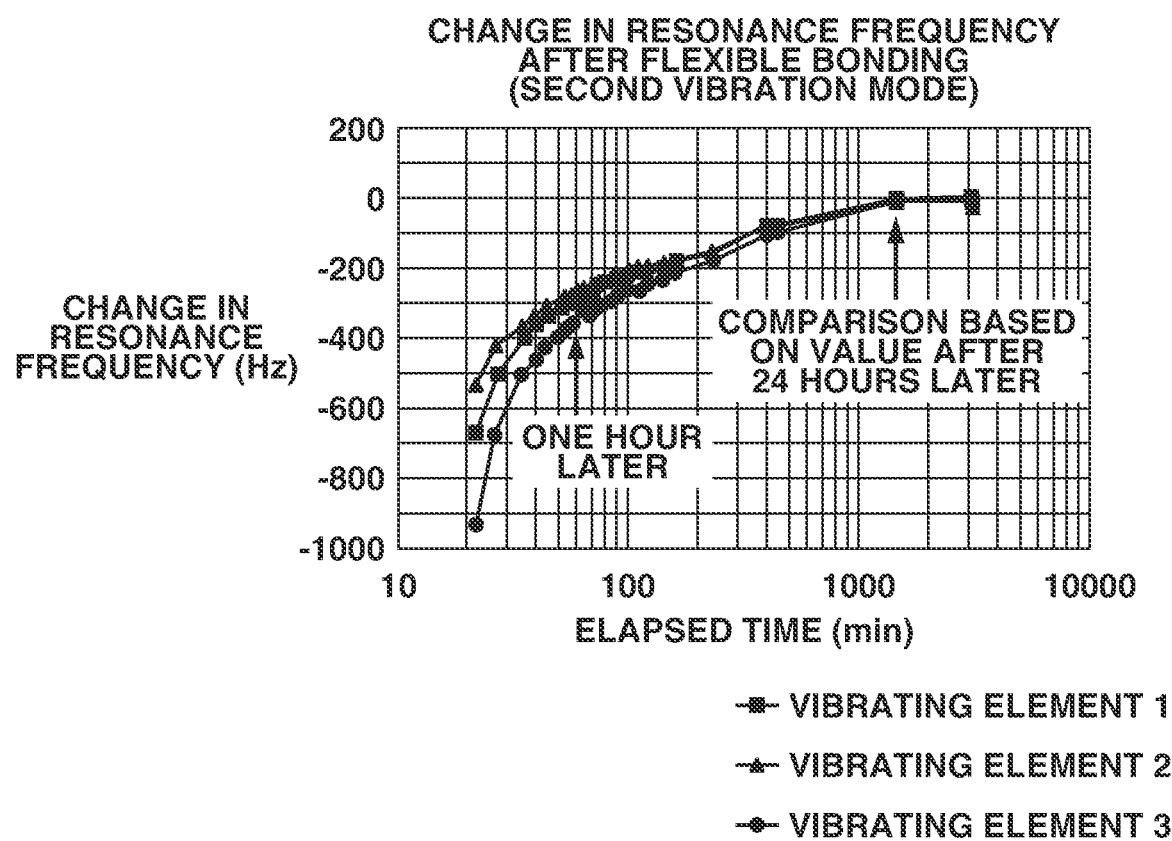
FIG. 6 is a diagram illustrating a change in the resonance frequency after flexible bonding of the vibrating element according to the exemplary embodiment.

As illustrated in FIG. 6, however, the resonance frequency changes during the 24 hours after the power feeding substrate 33 has been bonded. Thus, variations in a changing quantity of the resonance frequency until the resonance frequency becomes constant should be taken into consideration. Therefore, in the measurement of the resonance frequency in step S120, the range of the stratification in step S121 is narrowed and the ratio is less than or equal to 0.007 (0.7%).

The exemplary embodiments of the present disclosure have been described in detail above. However, the present disclosure is not limited to such specific exemplary embodiments, and variations are included in the present disclosure without deviating from the scope of the present disclosure. For example, the vibrating element 1 according to the exemplary embodiment of the present disclosure is applied not only to the rotary actuator illustrated in FIGS. 1A and 1B. For example, the vibrating element 1 can be applied also to a linear actuator where two vibrating elements 1 are disposed in a drive direction or are disposed on upper and lower surfaces of a contact element, respectively.

Further, the vibration type actuator according to the exemplary embodiment of the present disclosure is applicable to various usages such as lens drive of an image pickup apparatus (optical device), rotary drive of a photoconductive drum in a copying machine, or drive of a stage. Herein, as an example, an image pickup apparatus (optical device) where a vibration type actuator, which has a plurality of vibrating elements circularly disposed that rotationally drive the contact element, is used for driving lenses disposed in a lens barrel.

Figure 7A:
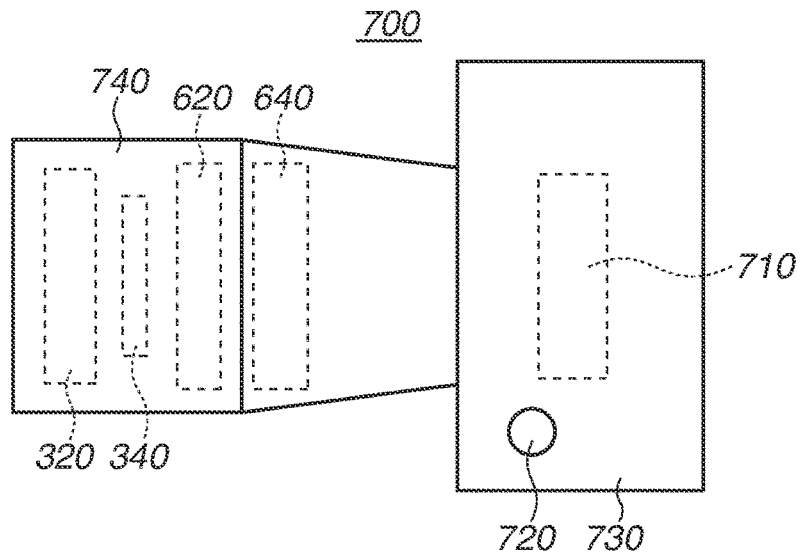
FIGS. 7A and 7B are a top view and a block diagram respectively illustrating a schematic configuration of an image pickup apparatus having the vibration type actuator according to the exemplary embodiment.

FIG. 7A is a top view illustrating a schematic configuration of an image pickup apparatus 700 as an electronic device.

The image pickup apparatus 700 includes a camera body 730 having an image pickup element 710 and a power button 720. The image pickup apparatus 700 further includes a lens barrel 740 having a first lens group (not illustrated), a second lens group 320, a third lens group (not illustrated), a fourth lens group 340, and vibration type actuators 620 and 640. The lens barrel 740 is detachable as an interchangeable lens from the camera body 730.

In the image pickup apparatus 700, the vibration type actuator 620 drives the second lens group 320 as a driven member. The vibration type actuator 640 drives the fourth lens group 340 as a driven member. The vibrating elements 1 described with reference to FIGS. 1A to 7A are used in the vibration type actuators 620 and 640. For example, rotation of a contact element configuring the vibration type actuator 620 is converted into linear motion in an optical axis direction by a gear, and a position of the second lens group 320 in the optical axis direction is adjusted. Much the same is true for the vibration type actuator 640.

Figure 7B:
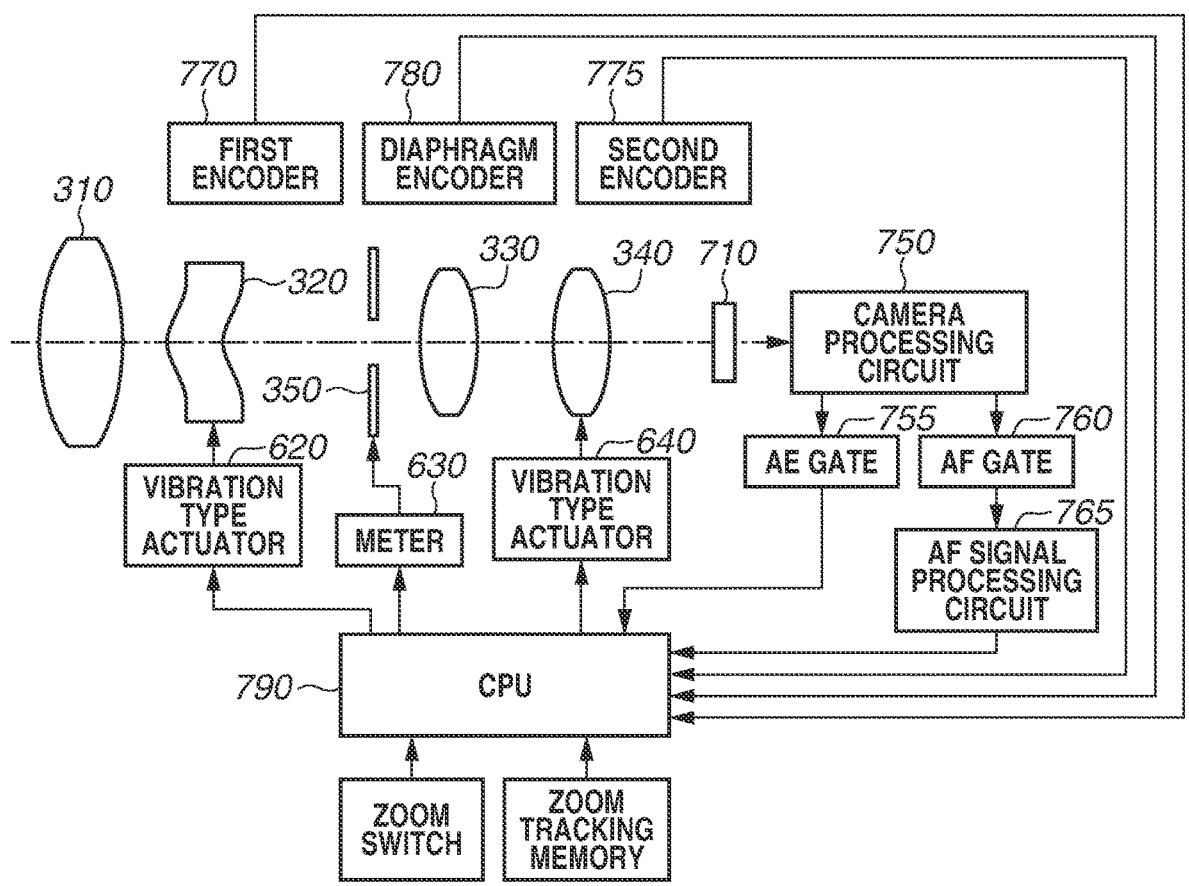

FIG. 7B is a block diagram illustrating a schematic configuration of the image pickup apparatus 700. The first lens group 310, the second lens group 320, the third lens group 330, the fourth lens group 340, and a light quantity adjustment unit 350 are disposed on predetermined positions on the optical axis inside the lens barrel 740. Light, which has passed through the first lens group 310 to the fourth lens group 340 and the light quantity adjustment unit 350, is imaged on the image pickup element 710. The image pickup element 710 converts an optical image into an electric signal to be output. The output is transmitted to a camera processing circuit 750.

The camera processing circuit 750 amplifies the output signal from the image pickup element 710 or performs gamma correction on the output signal. The camera processing circuit 750 is connected to a central processing unit (CPU) 790 via an auto exposure (AE) gate 755, and is connected to the CPU 790 via an autofocus (AF) gate 760 and an AF signal processing circuit 765 as well. A video signal, which has been subject to predetermined processing in the camera processing circuit 750, is transmitted to the CPU 790 via the AE gate 755, and the AF gate 760 and the AF signal processing circuit 765. The AF signal processing circuit 765 extracts a high-frequency component of the video signal, generates an evaluation value signal for autofocus (AF), and supplies the generated evaluation value to the CPU 790.

The CPU 790, which is a control circuit that controls an overall operation of the image pickup apparatus 700, generates a control signal for determining exposure or focusing based on the obtained video signal. The CPU 790 controls drive of the vibration type actuators 620 and 640 and a meter 630 so that the determined exposure and a suitable focused state can be obtained. Thus, the positions of the second lens group 320, the fourth lens group 340, and the light quantity adjustment unit 350 in the optical axis direction are adjusted.

Under the control using the CPU 790, the vibration type actuator 620 moves the second lens group 320 in the optical axis direction, and the vibration type actuator 640 moves the fourth lens group 340 in the optical axis direction. Further, the meter 630 controls drive of the light quantity adjustment unit 350.

The position of the second lens group 320, which is driven by the vibration type actuator 620, in the optical axis direction is detected by a first encoder 770. The CPU 790 is notified of the detected result, and then feeds back the detected result to the drive of the vibration type actuator 620. In a similar manner, the position of the fourth lens group 340, which is driven by the vibration type actuator 640, in the optical axis direction is detected by a second encoder 775. The CPU 790 is notified of the detected result, and then feeds back the detected result to the drive of the vibration type actuator 640.

The position of the light quantity adjustment unit 350 in the optical axis direction is detected by a diaphragm encoder 780. The CPU 790 is notified of the detected result, and then feeds back the detected result to the drive of the meter 630.

The vibration type actuators 620 and 640 are not limited to the application for driving the lens groups in the image pickup apparatus in the optical axis direction. The vibration type actuators 620 and 640 can also be used for an application for driving an image blur correction lens or an image pickup element in a direction orthogonal to the optical axis to correct image blurring.

According to the present disclosure, in a vibration type actuator having a plurality of vibrating elements, performance degradation caused by variations in the resonance frequency in the plurality of vibrating elements can be reduced.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2019-006395, filed Jan. 17, 2019, which is hereby incorporated by reference herein in its entirety.

What is claimed is:

1. A vibration type actuator comprising:
   a plurality of vibrating elements; and
   a contact element that is brought into contact with contact sections of the plurality of vibrating elements,
   wherein vibration excited in each of the plurality of vibrating elements causes relative movement of the plurality of vibrating elements and the contact element,
   wherein the vibration includes vibration in a first vibration mode where the contact sections are displaced in a first direction in which one of the plurality of vibrating elements and the contact element are made to pressure contact with each other and vibration in a second vibration mode where the contact sections are displaced in a second direction intersecting the first direction, and
   wherein, in the plurality of vibrating elements, a minimum value of a resonance frequency in the second vibration mode is greater than or equal to a maximum value of a resonance frequency in the first vibration mode and a ratio of a difference between the maximum value and the minimum value of the resonance frequency in the second vibration mode to the minimum value of the resonance frequency in the second vibration mode is less than or equal to a predetermined value.

2. The vibration type actuator according to claim 1, wherein the predetermined value is 0.01.

3. The vibration type actuator according to claim 1,
   wherein each of the plurality of vibrating elements has an electric energy-to-mechanical energy conversion element and an elastic element to which the electric energy-to-mechanical energy conversion element is bonded,
   wherein the elastic element has a protrusion, protruding in the first direction, on a surface of the elastic element opposite to a surface to which the electric energy-to-mechanical energy conversion element is bonded, and
   wherein the protrusion has a side wall section, forming a hollow structure, and the contact sections that are brought into contact with the contact element.

4. The vibration type actuator according to claim 1, wherein the second direction is orthogonal to the first direction.

5. The vibration type actuator according to claim 1, wherein an order of the first vibration mode is 1 and an order of the second vibration mode is 2.

6. An electronic device comprising:
   the vibration type actuator according to claim 1; and
   a driven member that is driven by the vibration type actuator.

\* \* \* \* \*